H. W. LORMOR.
PORTABLE ELECTRIC STORAGE BATTERY COVER REMOVER.
APPLICATION FILED AUG. 25, 1920.

1,411,444. Patented Apr. 4, 1922.

Inventor
Henry Webb Lormor.
by
Thurston Kwis & Hudson
attys.

UNITED STATES PATENT OFFICE.

HENRY WEBB LORMOR, OF CLEVELAND, OHIO, ASSIGNOR TO WILLARD STORAGE BATTERY CO., OF CLEVELAND, OHIO, A CORPORATION OF WEST VIRGINIA.

PORTABLE ELECTRIC-STORAGE-BATTERY COVER REMOVER.

1,411,444. Specification of Letters Patent. Patented Apr. 4, 1922.

Application filed August 25, 1920. Serial No. 405,953.

*To all whom it may concern:*

Be it known that I, HENRY WEBB LORMOR, a citizen of the United States, residing at Cleveland, in the county of Cuyahoga and State of Ohio, have invented a certain new and useful Improvement in a Portable Electric-Storage-Battery Cover Remover, of which the following is a full, clear, and exact description.

This invention relates to a device for removing the covers of storage battery cells. Storage batteries generally include a number of cells, each having a jar containing battery elements and electrolyte, and having a cover through which the positive and negative terminal posts extend, and provided with a removable vent plug having a vent opening for the escape of gas set free in the jar. The cover fits into the top of the jar and is secured in place by sealing compound which seals and secures the cover in the jar all around its perimeter.

When access is to be had to the interior of the cell, as for removing or changing the plates, or separators between the plates, it is necessary that the cover be removed, and this is done by softening the sealing compound by the application of heat.

The device made in accordance with the present invention is a portable unit, preferably in the form of a hood, the inside dimensions of which correspond substantially to the outline and size of the cover, so that it will fit over the cover when placed on the battery, and it comprises heating means both for the purpose of applying heat externally to the compound and for heating a medium such as air which can be supplied through the vent plug opening so as to heat the compound from the interior.

The invention may be briefly summarized as consisting in certain novel details of construction, and combinations and arrangements of parts which will be described in the specification and set forth in the appended claims.

Figure 1:
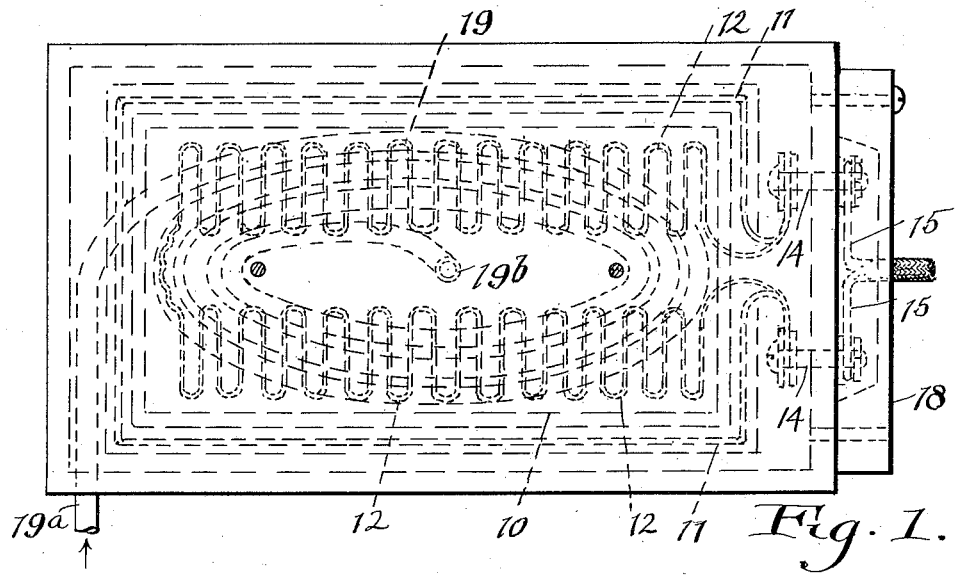
Figure 2:
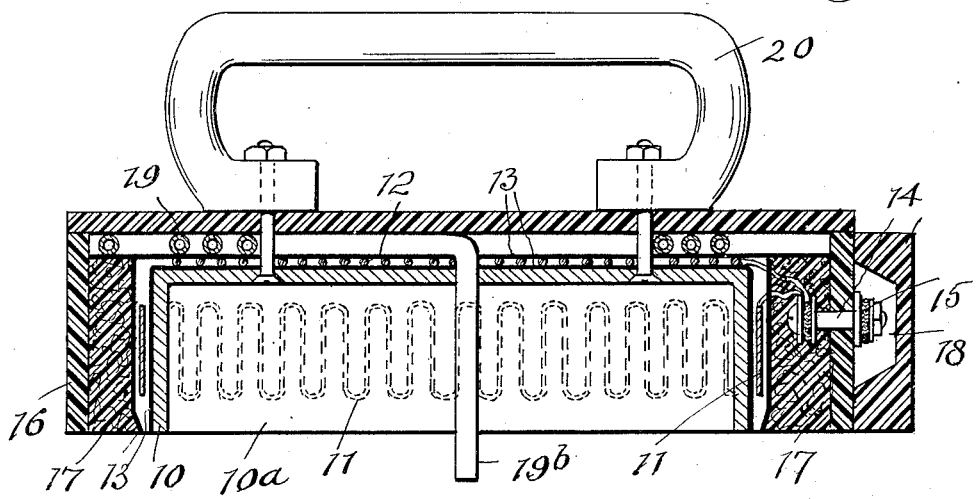

In the accompanying sheet of drawings, Fig. 1 is a top plan view of the device, certain parts on the interior being shown by dotted lines; and Fig. 2 is a vertical, sectional view with the upper part of a battery cell shown by dotted lines.

The device includes an inverted casing 10 which may be formed of iron, and which has its open end facing downward. The interior dimensions of this casing are preferably such that it will just fit around the top of a cell of a given size. Generally storage batteries made by a storage battery manufacturer comprise cells of two or more dimensions, but generally not many sizes of cells are put out. In consequence, for jars of different sizes, different sized cover looseners will be provided, with the inner chamber $10^a$ of the casing 10 corresponding in size and dimensions to a jar of each size and dimensions.

Surrounding the four upright sides of the casing 10, and also preferably laid over the top of the casing are electric heating elements 11 and 12 placed between the layers or strips 13, having good insulating properties such as mica. The ends of the heating elements are connected to binding posts 14, to the ends of which, electrical conductors 15 may be connected as shown in Fig. 1.

Surrounding the four sides and top of the device is a case 16 of good heat insulating material such as asbestos, and preferably the space between the outer layers of mica 13 and the sides of the case 16 is filled with asbestos paste, indicated at 17. The binding posts 14 extend through one of the sides or ends of the case 16, the inner ends of the posts and the adjacent ends of the conductors leading to the heating elements being embedded in the asbestos paste 17. The outer ends of the terminal posts and the ends of the conductor 15 connected thereto, are enclosed in a removable recessed insulating cover 18.

Between the top of the case 16 and the layer 13 of mica overlying the top heating element 12, I placé a coil of tubing 19, the outer end of the coil projecting laterally from one side of the case 16, as indicated at $19^a$, so that it can be attached to a suitable source of air under pressure. The inner end of the coil, indicated at $19^b$ extends downwardly through the top of the inner iron case 10 in a vertical direction, and projects somewhat beyond the bottom of the device. If the vent plugs of the cells for which the device is adapted are located at the center of the cell as is generally the case, then the end $19^b$ will extend downwardly at the center of the device, as illustrated in the drawings. In any event, the end $19^b$ of the air tube or tubing will extend downwardly through chamber $10^a$ of the inner case 10 so that it will fit into the vent plug opening which is provided in the cover of the jar.

To the top of the outer case 16 is secured a handle 20 by which the device may be lifted and carried about.

This device is used as follows: When it is desired to remove the cover from the jar, the device is placed over the cover in the manner already stated. Then current is passed through the heating elements, and air is passed through the tubing 19. The heating elements will quickly heat up the device, and this heats the air in the inner case 10, the effect being to heat the sealing compound of the jar cover externally. At the same time, the air passing through the tubing 19 is heated, and this air being supplied to the interior of a cell heats the compound from the interior. The result is that the compound is softened very quickly, permitting the cover to be removed from the jar far more quickly than with the instrumentalities used at the present time to soften the compound.

Having described my invention, I claim:

1. An apparatus for softening the compound by which a storage battery jar cover is secured to a jar, said apparatus comprising a chambered heating member adapted to be placed over the jar to heat the same externally, and a tube for supplying a heating medium to the interior of the jar when the heating member is over the jar.

2. In a cover loosener for storage batteries, a member adapted to be placed over a battery cell and when so placed having means for externally heating compound securing the cover to a battery jar, and also having means for supplying a heating medium to the interior of the jar.

3. A device for softening compound which holds a storage battery cover to a storage battery jar, said device comprising a chambered device adapted to be placed over the jar, and having a heating element by which the compound is heated externally, and having a tube for supplying heated air to the interior of the jar, said tube having a portion positioned so that the air passing through it is heated by the heating element.

4. In a device for softening compound which seals a cover to a container, a hood adapted to be placed over the container and provided with a pipe for the supply of heated air, said pipe extending downwardly through the hood so that it may be extended into an opening of the container.

5. In a device for softening compound which seals a cover to a container, a hood adapted to be placed over the container and provided with a pipe for the supply of heated air, said pipe extending downwardly through the hood so that it may be extended into an opening of the cover, and a heating element carried by the hood and adapted to heat the air in the tubing and to heat the space within the hood.

In testimony whereof, I hereunto affix my signature.

HENRY WEBB LORMOR.